United States Patent [19]

Lin

[11] Patent Number: 4,991,103
[45] Date of Patent: Feb. 5, 1991

[54] REAR WHEEL ANTI-LOCK BRAKE CONTROLLER

[75] Inventor: William C. Lin, Troy, Mich.

[73] Assignee: General Motors Corporation, Detroit, Mich.

[21] Appl. No.: 430,033

[22] Filed: Nov. 1, 1989

[51] Int. Cl.$^5$ ............................................. B60T 8/32
[52] U.S. Cl. ............................... 364/426.02; 303/100; 303/106; 180/197
[58] Field of Search ................. 364/426.02, 426.03; 303/96, 100, 106, 109, 95, 102, 103; 180/197; 361/238

[56] References Cited

U.S. PATENT DOCUMENTS

| | | | |
|---|---|---|---|
| 4,670,852 | 6/1987 | Masaki et al. | 364/426.02 |
| 4,755,945 | 7/1988 | Kade et al. | 364/426.02 |
| 4,759,590 | 7/1988 | Uchida et al. | 364/426.02 |
| 4,819,168 | 4/1989 | Laskey | 364/426.02 |
| 4,855,916 | 8/1989 | Bernard | 364/426.02 |
| 4,866,625 | 9/1989 | Kawamoto et al. | 364/426.02 |

Primary Examiner—Parshotam S. Lall
Assistant Examiner—Tyrone Queen
Attorney, Agent, or Firm—Howard N. Conkey

[57] ABSTRACT

A rear wheel speed reference utilized in an anti-lock brake controller as the basis for controlling the rear wheel brakes of a vehicle controlled by a common control signal is established based on the road surface condition. When the vehicle is being braked on a split coefficient of friction surface, the rear wheel speed reference is established at the wheel speed which is the lowest between the two wheels. This provides braking in accord with a select low mode of operation. However, when the two rear wheels are being braked on a uniform surface, the rear wheel speeds are processed such that an average of the two wheel speeds is provided as the rear wheel speed reference for establishing the braking control signal for the rear wheels.

4 Claims, 3 Drawing Sheets

REAR WHEEL ANTI-LOCK BRAKE CONTROLLER

BACKGROUND OF THE INVENTION

This invention relates to an automotive vehicle rear wheel anti-lock brake control system.

When the brakes of a vehicle are applied, a braking force between the wheel and the road surface is generated that is dependent upon various parameters including the road surface condition and the amount of slip between the wheel and the road surface. For a given road surface, the force between the wheel and the road surface increases with increasing slip values to a peak force occurring at a critical wheel slip value. As the value of wheel slip increases beyond the critical slip value, the force between the wheel and the road surface decreases. Stable braking results when the slip value is equal to or less than the critical slip value. However, when the slip value becomes greater than the critical slip value, the wheel rapidly begins to approach a wheel lockup condition resulting in a reduced vehicle stopping distance and a deterioration in the lateral stability of the vehicle.

Numerous wheel lock control systems have been proposed to prevent the wheels from locking while being braked. These systems generally prevent a wheel from locking by controlling the applied brake pressure when an incipient wheel lockup condition is sensed so as to limit wheel slip at or near the critical slip value and thereby establish substantially the maximum possible braking force between the tire and road surface.

Some of the known wheel lock control systems utilize an independent mode of braking wherein each of the front and rear vehicle wheels are individually controlled so as to establish the maximum possible braking force at each wheel during wheel lock controlled braking. By so maximizing the braking forces at each wheel, the stopping distance of the vehicle is minimized. However, under certain conditions, this mode of operation can lead to reduced vehicle stability. One such condition is a grossly different coefficient of friction between the right and left sides of the vehicle, hereafter referred to as a split coefficient of friction surface.

In order to improve vehicle stability during braking on surfaces having different coefficients of friction between the right and left sides of the vehicle, it has been proposed to control the two rear wheels with a common braking pressure in a manner such that a wheel lock condition is prevented even at the wheel which is on the side of the road surface having the lowest coefficient of friction. One known method for achieving this objective is to control the brake pressure at each of the rear wheel brakes in response to the conditions of the rear wheel being braked on the lower coefficient of friction surface. This form of control is commonly referred to as a select low mode of wheel lock control. The rear wheel being braked on the lowest coefficient of friction surface is typically indicated by the wheel having the lowest speed between the two rear wheels and a reference speed represented by the lowest speed of the two wheels is used as a basis for control.

However, when the rear wheels are being braked on a substantially uniform surface, the two rear wheel speeds are never exactly the same and are randomly higher or lower than each other. In this situation, the reference speed based on the lowest of the two wheel speeds is a noise intensified signal. Controlling in response to this noise intensified signal can result in a deterioration in the effectiveness of the anti-lock brake controller particularly where the control includes an anticipatory term.

SUMMARY OF THE INVENTION

The present invention provides for an improved system and method for establishing the rear wheel speed reference utilized as the basis for controlling the rear wheel brakes of a vehicle controlled by a common control signal. In general, this invention establishes a rear wheel reference speed that is based on the road surface condition. When the vehicle is being braked on a split coefficient of friction surface, the rear wheel speed reference is established at the wheel speed which is the lowest between the two wheels as the rear wheel speed reference. This provides braking in accord with a select low mode of operation which provides for stable braking on a split coefficient of friction surface. However, when the two rear wheels are being braked on a uniform surface, the invention provides for the processing of the rear wheel speeds such that an average of the two wheel speeds is provided as a reference for establishing the braking control signal for the rear wheels. The resulting rear wheel speed reference is a smoother reference providing for more effective anti-lock brake control.

In a specific form of this invention, the reference rear wheel speed $\omega^*$ is generated in accord with an expression $K\omega_l + (1-K)\omega_r$, where $\omega_l$ is the left rear wheel speed, $\omega_r$ is the right rear wheel speed and $K$ is a weighting factor ranging from 1 to 0. When the weighting factor $K$ is 1, the reference speed $\omega^*$ is equal to the left rear wheel speed $\omega_l$. Conversely, when the weighting factor $K$ is 0, the reference wheel speed $\omega^*$ is equal to the right rear wheel speed $\omega_r$. At intermediate values of the weighting factor $K$, the reference speed $\omega^*$ is based on a weighted combination of the two rear wheel speeds $\omega_l$ and $\omega_r$.

To determine the value of the weighting factor $K$ in the range from 1 to 0, a parameter $S$ is first determined based on the road condition by comparison of the left and right rear wheel speeds $\omega_l$ and $\omega_r$. For example, in one embodiment, the parameter $S$ is set to 1 when the left wheel speed is lower than the right wheel speed and is set to a value of 0 when the right rear wheel speed is lower than the left rear wheel speed. In another embodiment, the parameter $S$ is further set to a value of 0.5 when the difference between the rear wheel speeds is within a certain percentage of the average speed of the two rear wheels.

The parameter $S$ is then used to provide an on-line update for deciding the value of the waiting factor $K$ for the rear wheel speed reference. The factor $K$ having an initial value of 0.5 is updated by the parameter $S$ during the course of braking in accord with the first order lag expression $K_{new} = CK_{old} + (1-C)S$, where $C$ establishes the time constant of the expression.

The result of the foregoing is the provision of a reference rear wheel speed that will resultingly use the wheel speed which is lowest between the two rear wheels when the vehicle is braking on a split coefficient of friction surface and which is an average of the two wheel speeds when the rear wheels are being braked on a uniform road surface. This results in a substantially smoother rear wheel speed reference for a more effective control of the rear wheel brakes.

DESCRIPTION OF THE DRAWINGS

The foregoing invention may be best understood by reference to the following description of the preferred embodiment of the invention and the drawings in which.

DESCRIPTION OF THE PREFERRED EMBODIMENT

Figure 1:
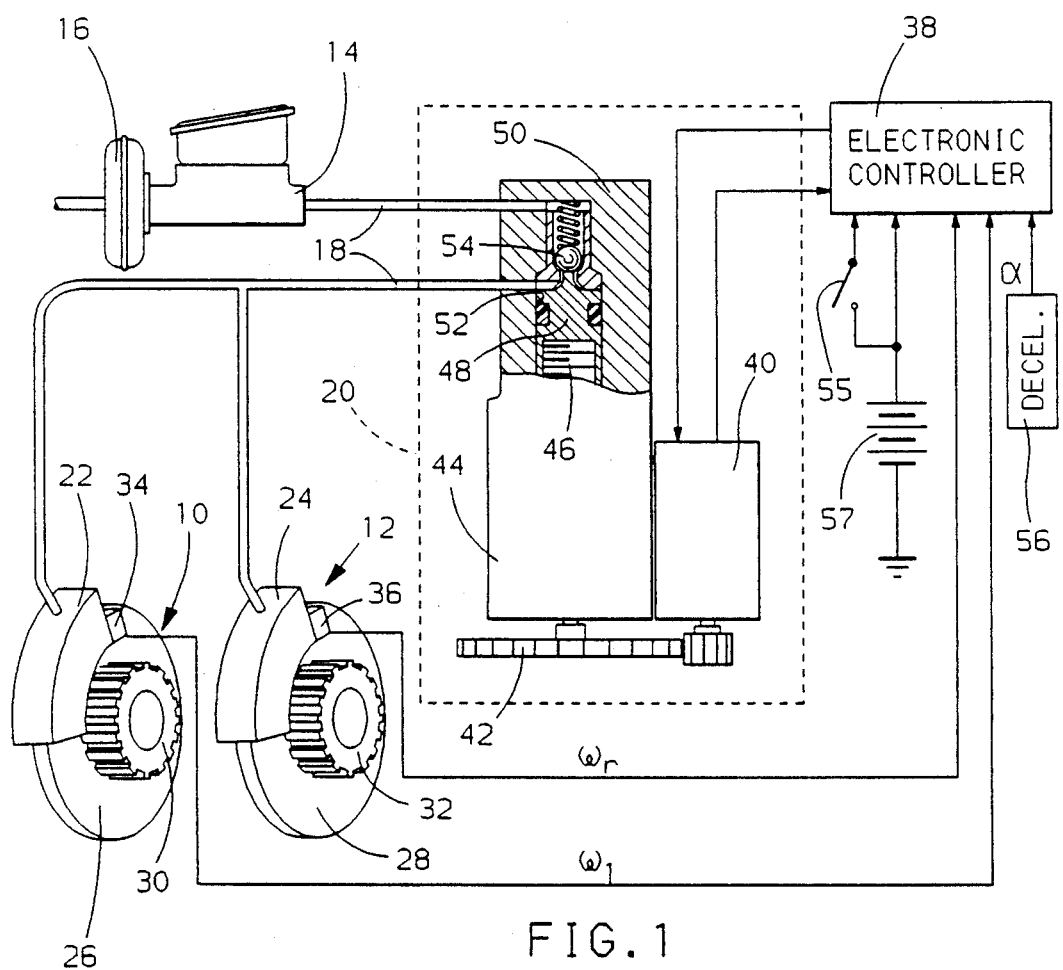
FIG. 1 is a general diagram of a braking system for controlling the rear wheel brakes of a vehicle in accord with the principles of this invention.

A wheel lock control system for the left and right rear wheels of a motor vehicle is illustrated in FIG. 1. In general, the left and right rear wheels include brake units 10 and 12 respectively, each being operated by hydraulic pressure provided by a master cylinder 14 and hydraulic boost unit 16 operated by the vehicle operator. The hydraulic fluid under pressure from the master cylinder 14 is provided to the brake units 10 and 12 via brake lines 18 and a pressure modulator 20. Each of the brake units 10 and 12 is illustrated as a disk brake system that includes the calipers 22 and 24 located at respective rotors 26 and 28. The rear wheels include respective wheel speed sensing assemblies comprised of exciter rings 30 and 32 rotated with the rear wheels and electromagnetic sensors 34 and 36 which monitor the rotation of the exciter rings to provide signals having frequencies proportional to the respective wheel speeds $\omega_l$ and $\omega_r$. The wheel speed signals from the sensors 34 and 36 are provided to an electronic controller 38.

The pressure modulator 20 is controlled by the electronic controller 38 to limit the brake pressure applied to the wheel brake assemblies 10 and 12 to prevent wheel lockup. The modulator 20 is illustrated in an inactive position wherein it is transparent to the braking system. This is the modulator condition during normal vehicle braking. In general, when the controller 38 senses a braking condition whereat one of the wheels 10 or 12 is approaching an incipient wheel lock condition, the pressure modulator 20 is controlled to regulate the braking pressure to each of the rear wheels to maintain the braking of the wheel on the lowest coefficient of friction surface in a stable braking region.

The pressure modulator 24 includes a DC torque motor 40 whose output shaft drives a gear train 42 which in turn rotates a linear ball screw actuator 44. The ball screw actuator is a conventional actuator containing a linearly stationary ball screw which when rotated linearly positions a nut 46. The nut 46 terminates in a piston 48 such that as the linear ball screw rotates, the piston 48 is either extended or retracted depending upon the direction of rotation of the torque motor 40.

The modulator 20 includes a housing 50 in which a cylinder 52 is formed. The piston 48 is reciprocally received within the cylinder 52. The cylinder 52 forms a portion of the fluid path between the master cylinder 14 and the wheel brake units 10 and 12 of the left and right rear wheels. Included within this fluid path is a normally closed check valve 54 which, when closed, isolates the master cylinder 14 from the wheel brake units 10 and 12. The ball check valve 54 is operated to an open position by the piston 48 when positioned in an extended position within the cylinder 52 as illustrated in FIG. 1.

When the ball check valve 54 is so opened, fluid communication is provided between the master cylinder and the wheel brake units 10 and 12. This position is the normal inactive position of the pressure modulator 20 so that normal braking of the rear wheels of the vehicle is provided upon actuation of the brakes by the vehicle operator. However, when the torque motor 40 is operated by the electronic controller 38 to modulate the braking pressure in the wheel brake units 10 and 12, the piston 48 is retracted allowing the ball check valve to seat and isolate the master cylinder from the wheel brake units 10 and 12. Further retraction of the piston 48 functions to increase the volume and the cylinder 52 thereby decreasing the pressure applied to the rear wheel brakes 10 and 12. By controlling the DC torque motor 40, the pressure at the wheel brakes can therefore be modulated to controlled values until such time that the piston again unseats the ball check valve 54 or until the pressure generated by the pressure modulator at the wheel brake units 10 and 12 exceeds the fluid pressure output of the master cylinder 14.

The antilock control system of FIG. 1 is operative at all times while the vehicle is in operation. As the rear wheels rotate, the exciter rings 30 and 32 rotate causing the wheel speed sensors 34 and 36 to generate signals proportional to the left and right rear wheel speeds $\omega_l$ and $\omega_r$. Initially, the ball screw actuator 44 is in the position whereby the piston 48 is in the extended position illustrated in FIG. 1 with the ball check valve 54 held open. When so conditioned, when the vehicle operator applies the vehicle brakes, the pressure modulator is in the passive or transparent mode so that the hydraulic fluid passes through the brake line 18 and the check valve into the wheel brake calipers 22 and 24 thereby providing normal rear wheel braking.

However, when the electronic controller determines that the conditions of one of the rear wheels represents an incipient wheel lockup condition, the controller 38 commands the torque motor 40 to reverse the ball screw actuator 44 thereby causing the piston 48 to retract and the ball check valve 54 to seat thereby isolating the master cylinder 14 from the wheel brake units 10 and 12. Further positioning of the piston 48 by the controller 38 via the control of the torque motor 40 functions to control the braking pressure at the rear wheel brake units 10 and 12 to maintain the braking of the wheel on the lowest coefficient of friction surface in a stable braking region.

As previously described, this invention establishes a rear wheel reference speed used in controlling the rear brakes that is based on the road surface condition. When the vehicle is being braked on a split coefficient of friction surface, the controller 38 establishes the rear wheel speed reference at the wheel speed which is the lowest between the two wheels. This provides braking in accord with a select low mode of operation which provides for stable braking on a split coefficient of friction surface. However, when the two rear wheels are being braked on a uniform surface, the controller 38 processes the rear wheels such that an average of the two wheel speeds is provided as the rear wheel speed reference. The resulting rear wheel speed reference is a smoother reference providing for more effective anti-lock brake control.

The electronic controller 38 takes the form of a digital computer in the preferred embodiment. This computer is standard in form and typically includes a central processing unit which executes an operating program permanently stored in a read-only memory which also stores tables and constants utilized in controlling the modulator 20 to prevent wheel lockup. The electronic controller also typically includes a random access memory into which data may be temporarily stored and from which data may be read at various address locations determined in accord with the program stored in the ROM.

The digital computer further an input/output circuit controlled by the central processing unit to provide a motor control signal to the torque motor 40 for modulating the brake pressure at the brake units 10 and 12 for anti-lock brake control. The input/output circuit also includes an input counter section which receives the output from the sensors 34 and 36 to determine the left and right rear wheel speeds $\omega_l$ and $\omega_r$ and a discrete input port for receiving the output of a conventional brake switch 55.

An analog-to-digital converter is provided in the controller 38 for measuring the value of analog input signals including a vehicle deceleration signal $\alpha$ from a chassis decelerometer 56. The analog signals are sampled and converted under control of the central processing unit.

Figure 2:
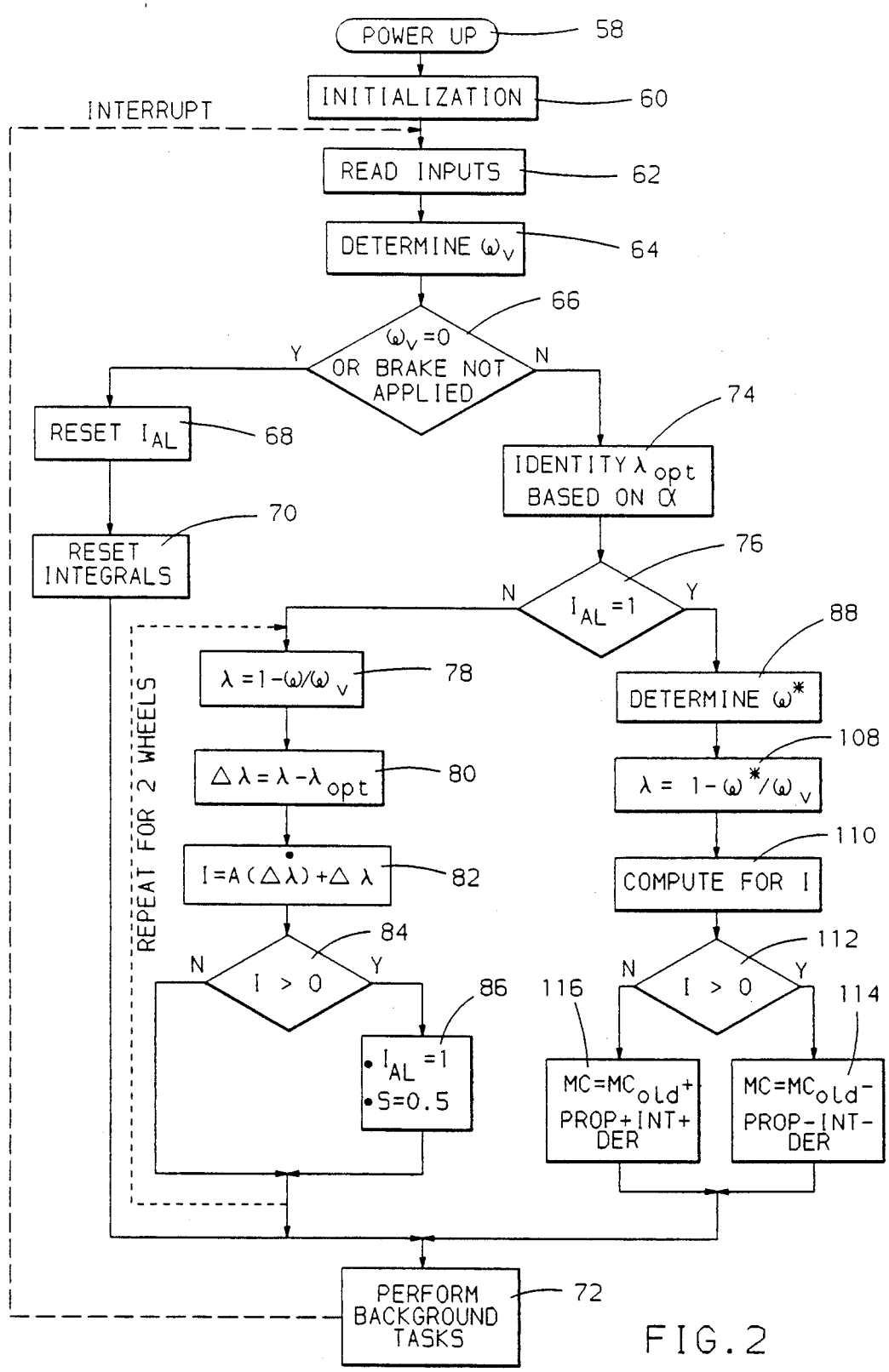
FIGS. 2 and 3 are flow charts detailing the operation of the braking system of FIG. 1.
Figure 3:
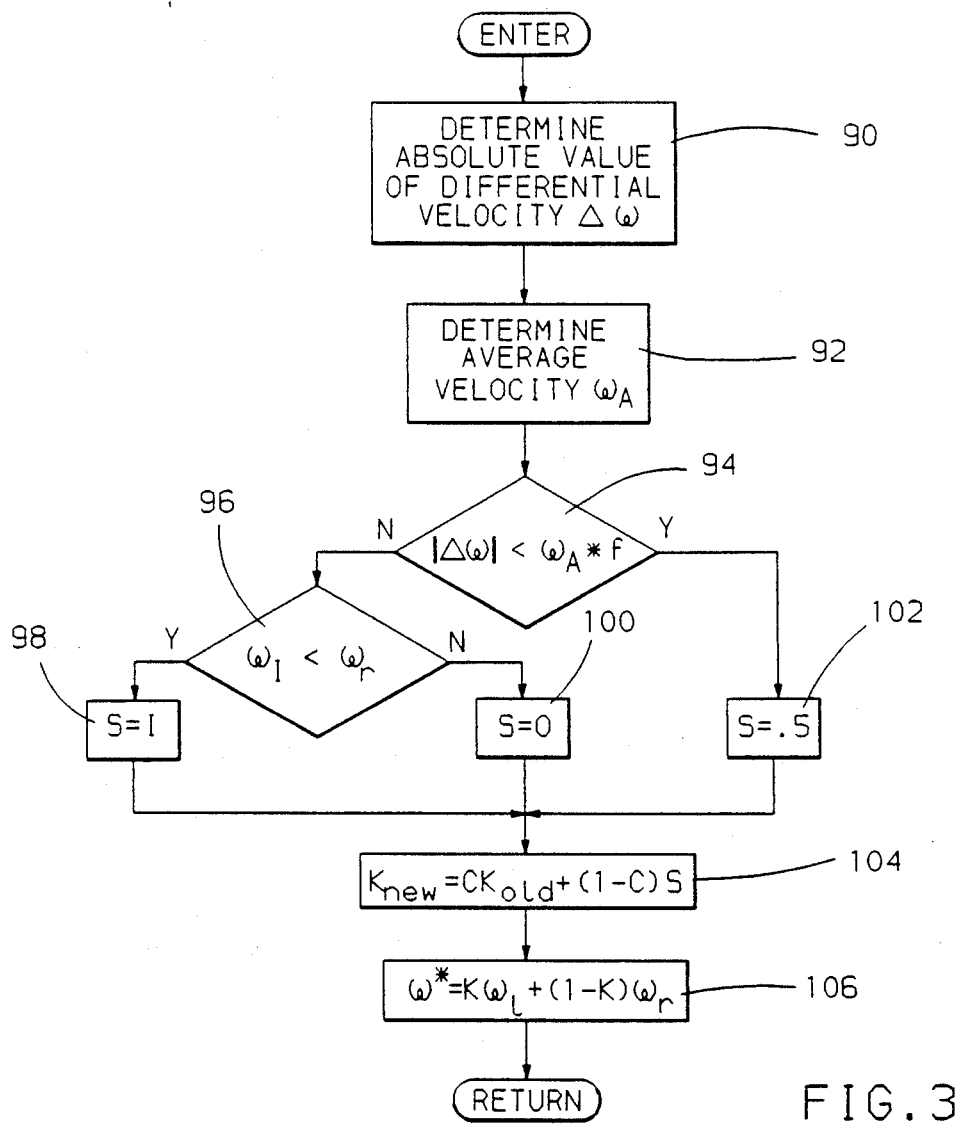

The operation of the electronic controller 38 in controlling the brake pressure to the brake units 10 and 12 in accord with the principles of this invention is illustrated in FIGS. 2 and 3. The ROM of the digital computer contains the instructions necessary to implement the algorithm diagrammed in those FIGURES. Referring first to FIG. 2, when power is first applied to the system from a vehicle battery 57 such as when a conventional vehicle ignition switch (not illustrated) is rotated to its On position, the computer program is initiated at point 58 and then provides for system initialization at step 60. For example, at this step initial values stored in the ROM are entered into ROM designated RAM memory locations and counters, flags and timers are initialized. This process may also include the control of the modulator 20 to insure that the linear ball screw actuator 44 has extended the piston 48 to place the modulator in the transparent mode previously described and as illustrated in FIG. 1.

Once the system has been initialized, control cycle interrupts are enabled to occur such as by resetting an interrupt mask bit in the central processing unit of the controller 38. Once enabled, an interrupt is provided at repeated intervals such as 5 millisecond intervals during which the control cycle comprised of the remaining portion of the routine of FIG. 2 is executed.

Upon the occurrence of a control cycle interrupt, the value $\alpha$ of vehicle deceleration provided by the decelerometer 56 is read via the analog-to-digital converter and the wheel speed values $\omega_r$ and $\omega_l$ are read and stored in RAM memory locations.

From step 62, the program proceeds to a step 64 where vehicle speed as represented by a hypothetical zero slip wheel speed $\omega_v$ is determined from the integration of the output of the vehicle chassis decelerometer 56. This determination is based on the known system constants including the radius of the vehicle wheel. The value $\omega_v$ represents vehicle speed in terms of the speed of a hypothetical unbraked wheel and is utilized in determining the slip of the braked rear wheels of the vehicle as will be described.

If the vehicle speed is zero or if the vehicle brakes are not applied (brake switch 55 open), wheel lockup cannot occur. If either of these conditions exist as sensed at step 66, the program resets an antilock flag $I_{AL}$ at step 68. This flag, if set, indicates that the electronic controller 38 is operating in an antilock control mode. Conversely, if reset, the flag represents the controller 38 is not operating in an antilock control mode.

Additionally, when not in an antilock control mode, the various integral terms used for control purposes during antilock control operation are reset at step 70. For example, the control of the current to the DC torque motor 40 may include an integral term to establish a desired braking level. These integral terms are reset at the step 70. Thereafter, the program proceeds to execute background tasks at a step 72 until the occurrence of the next interrupt. The background task may consist, for example, of diagnostic self-check activities.

Following each subsequent interrupt, the foregoing steps 62 through 70 are repeated until the step 66 determines that both the vehicle speed is greater than zero and the operator is applying the vehicle brakes as represented by closure of the brake switch 55. When this condition is sensed, the program proceeds to a step 74 where an optimal slip value $\lambda_{opt}$ is determined based on the value of vehicle deceleration $\alpha$. In one embodiment, the optimal slip value may be obtained from a memory lookup table storing values of the optimal slip $\lambda_{opt}$ as a function of the magnitude of the measured vehicle deceleration $\alpha$. In another embodiment, a determined actual slip value based on the difference between the vehicle speed $\omega_v$ and the lowest of the two left and right wheel speeds $\omega_l$ and $\omega_r$ occurring at the peak sensed vehicle deceleration $\alpha$ is identified as the optimum slip value $\lambda_{opt}$. This embodiment may provide for comparing the present vehicle deceleration with the prior detected vehicle deceleration and storing the computed slip value as the optimum slip value if the present vehicle deceleration is greater than the prior vehicle deceleration.

Following the identification of the optimum wheel slip value $\lambda_{opt}$, the antilock flag $I_{AL}$ is sampled to determine if the system is presently in an antilock control mode. Assuming the antilock flag is reset, the program determines whether or not a condition exists at either of the rear wheels that require limiting the brake pressure applied to the respective wheel brake to limit wheel slip. This process begins for a selected one of the rear wheels at a step 78 where the actual slip $\lambda$ of the wheel is determined in accord with the expression $1-\omega/\omega_v$, where $\omega$ is either $\omega_l$ or $\omega_r$ depending on the selected wheel. The optimum slip $\lambda_{opt}$ is then subtracted from the actual slip value $\lambda$ at step 80 to obtain a differential slip value $\Delta\lambda$. If $\Delta\lambda$ is greater than zero indicating the actual slip of the wheel is greater than the optimum slip for the wheel, or if the sum of $\Delta\lambda$ and an anticipation term based on the rate of change of $\Delta v$ is greater than zero, an incipient wheel lockup condition exists requiring control of the wheel brakes to limit the slip of the vehicle wheel. To determine this condition, first an index term I is determined at step 82 that is a sum of the value of $\Delta\lambda$ and an anticipation term $A(d\Delta\lambda/dt)$. In one embodiment, A has a value of 0.03. A positive value of I represents a condition requiring control of the wheel brakes to limit the slip of the left or right rear wheel whose slip was computed at step 78. To determine if this condition exists, the next step 84 compares the index term I determined at step 82 is compared to zero. If equal to or less than zero indicating the wheel slip is not excessive, the program then repeats the steps 78 through 84 for the other one of the rear wheels. If the index term I for that wheel is also equal to or less than unity, the routine proceeds from step 84 to step 72 and performs the background tasks. However, if the index term I for either wheel is greater than zero indicating an excessive slip condition, a step 86 is executed where the antilock flag $I_{AL}$ is set to place the routine in an antilock control mode and a value of a factor S utilized in accord with the principles of this invention in determining the rear wheel speed reference is set to a value of 0.5. When the steps 78 through 84 (or 86) have been repeated for both wheels, the program proceeds to perform the background tasks at step 72.

If the antilock flag $I_{AL}$ was set at step 86 for either one of the rear wheels, this condition is sensed at step 76 so that the program proceeds to a step 88 where a rear wheel speed reference value $\omega^*$ is determined in accord with this invention. This value represents a rear wheel speed reference value utilized in determining rear wheel slip during antilock controlled braking of the rear wheels. As previously described, it is desirable when braking on a split coefficient of friction surface for this wheel speed reference to be equal to the lowest speed of the left and right rear wheels. This "select low" mode provides for limiting slip in accord with the condition of the wheel on the lowest coefficient of friction surface and enhances vehicle stability. However, when the rear wheels are being braked on a substantially uniform coefficient of friction surface, use of this select low wheel speed results in a noise intensified wheel speed reference. When controlling slip particularly when based on an anticipatory slip term such as described in reference to step 82, the control effectiveness may be affected. In accord with this invention, the rear wheel speed reference $\omega^*$ is computed such that during sustained braking of the vehicle on a split coefficient of friction surface, the rear wheel speed reference becomes equal to the lowest of the two rear wheel speeds $\omega_l$ and $\omega_r$ and when the wheels are being braked on a uniform coefficient of friction surface, the rear wheel speed reference $\omega^*$ is established at substantially a straight line average of the two wheel speeds which reduces the effect of the random nature of the road tire contact for a more effective antilock brake control.

Referring to FIG. 3, a detailed illustration of the routine executed at step 88 in determining the rear wheel speed reference $\omega^*$ in accord with this invention is illustrated. When entered, this routine proceeds to a step 90 where the absolute value of the difference $\Delta\omega$ between the rear wheel speeds $\omega_l$ and $\omega_r$ is determined. The average $\omega_A$ of the left and right rear wheel speeds $\omega_l$ and $\omega_r$ is next determined at step 92. Step 94 then determines whether the absolute value of the differential velocity $\Delta\omega$ is less than some predetermined fraction f of the average speed $\omega_A$. The fraction f may represent, for example, 5%. If the absolute value of the differential velocity $\Delta\omega$ is outside the threshold value represented by the predetermined fraction of the average wheel speeds $\omega_A$, the program proceeds to a step 96 where the left wheel speed $\omega_l$ is compared to the right rear wheel speed $\omega_r$. If the left rear wheel speed is less than the right rear wheel speed, the factor S is set to unity at step 98. Conversely, if the right rear wheel speed is greater than the left rear wheel speed, the factor S is set to zero at step 100. As will be described, when S is set to unity, the rear wheel speed reference $\omega^*$ will be adjusted toward the left rear wheel speed $\omega_l$. Conversely, if the factor S is zero, the resultant rear wheel speed reference $\omega^*$ will be adjusted toward the right rear wheel speed $\omega_r$.

Returning to step 94, if the absolute value of the difference between the two wheel speeds is less than the predetermined fraction of the average of the two wheel speeds, the factor S is set to a value of 0.5 at step 102. This condition exists when the two wheel speeds are substantially equal.

Following step 98, 100 or 102, the program determines a new value of the weighting factor K at step 104 in accord with the expression $K_{new} = CK_{old} + (1-C)S$. This expression is in the form of a first order lag filter in which C establishes the time constant of the filter. In one embodiment, C may be 0.6. Accordingly, the weighting factor K is a filtered value of S which will approach the value of S at a predetermined rate determined by the time constant C. Therefore, if the left wheel speed $\omega_l$ is less than the right rear wheel speed $\omega_r$ such that S is equal to unity, K will approach unity at the predetermined rate established by the time constant C. Similarly, if the right rear wheel speed is less than the left rear wheel speed such that S is set equal to zero, K will approach zero at the predetermined rate determined by the time constant C. In the same manner, if the two wheel speeds are substantially equal such that the value of S is equal to 0.5, K will approach the value of 0.5 at a rate determined by the time constant C. In another embodiment, the value of K may be linearly ramped toward the value of S at a predetermined rate to effectively establish a filtered value of S.

The rear wheel speed reference $\omega^*$ is then determined at step 106 in accord with the expression $\omega^* = K\omega_l + (1-K)\omega_r$. As can be seen, when K is equal to unity, the rear wheel speed reference $\omega^*$ is equal to the left rear wheel speed $\omega_l$. Conversely, when K is equal to zero, the rear wheel speed reference $\omega^*$ is equal to the right rear wheel speed $\omega_r$. At intermediate values of the weighting factor K, the reference speed $\omega^*$ is based on a weighted combination of the two rear wheel speeds $\omega_l$ and $\omega_r$. For the condition where the rear wheel speeds are substantially equal such that S remains at 0.5 resulting in K assuming a value of 0.5, the rear wheel speed reference $\omega^*$ then becomes the equal weighted average of the two rear wheel speeds $\omega_l$ and $\omega_r$.

In another embodiment, S may be established only at either unity or zero depending on the relative values of the left and right rear wheel speeds such as established by steps 96, 98 and 100. In this case, the first order filter expression of step 104 will provide for a value of the weighting factor K equal to 1 if the value of S dwells at 1 for a period of time dependent on the value of C and will assume a value of zero if the value of S dwells at zero for a period of time dependent on the value of C. For a uniform coefficient of friction surface where the relative values of the left and right rear wheel speeds are random, K will assume an intermediate value to provide for a rear wheel speed reference $\omega^*$ having the aforementioned characteristics of providing a select low wheel speed on a split coefficient of friction surface and providing an intermediate average value when braking on a uniform coefficient of friction surface.

In either of the above embodiments, the effect of the random nature of the relationship between the rear wheel speeds when the wheels are being braked on a uniform coefficient of friction surface is minimized.

When the routine of FIG. 3 for determining the rear wheel speed reference $\omega^*$ is completed, the program returns to the routine of FIG. 2 and executes a step 108 at which the wheel slip $\lambda$ is determined based upon the rear wheel speed reference value $\omega^*$. Thereafter, the index value I is computed at step 110 using the same expression utilized at step 82 previously described. Because of the anticipation term in this expression, the determination of the wheel speed reference value $\omega^*$ in accord with this invention when braking on a uniform coefficient of friction surface having reduced noise provides for more effective control of wheel slip.

Slip is controlled by the controller 38 by adjusting the current to the DC torque motor 40 to establish the pressure at the rear wheel brakes 34 and 36 for maintaining the slip $\lambda$ determined at step 108 based on the rear wheel speed reference $\omega^*$ at the optimum slip $\lambda_{opt}$ determined at step 74. This control is established beginning at step 112 where the index term computed at step 110 is compared to zero. If greater than zero indicating an excessive slip condition requiring a reduction in the brake pressure applied to the rear wheel brakes 10 and 12, the program proceeds to a step 114 where the motor current is decreased in accord with proportional, integral and derivative terms to cause the motor 40 to retract the piston 48 to reduce the braking force and the resulting slip toward the optimal slip value $\lambda_{opt}$. If, however, the index term I is less than zero indicating slip less than the optimal slip value, the program proceeds to a step 116 where the motor current is increased in accord with proportional, integral and derivative terms to cause the motor 40 to extend the piston 48 to apply increased braking force to the rear wheel brakes 10 and 12 and increase the resulting slip toward the optimal slip value $\lambda_{opt}$.

Through repeated executions of the control cycle at the interrupt interval, the wheel slip based upon the rear wheel speed reference $\omega^*$ is maintained at the optimal slip value $\lambda_{opt}$.

Figure 4:
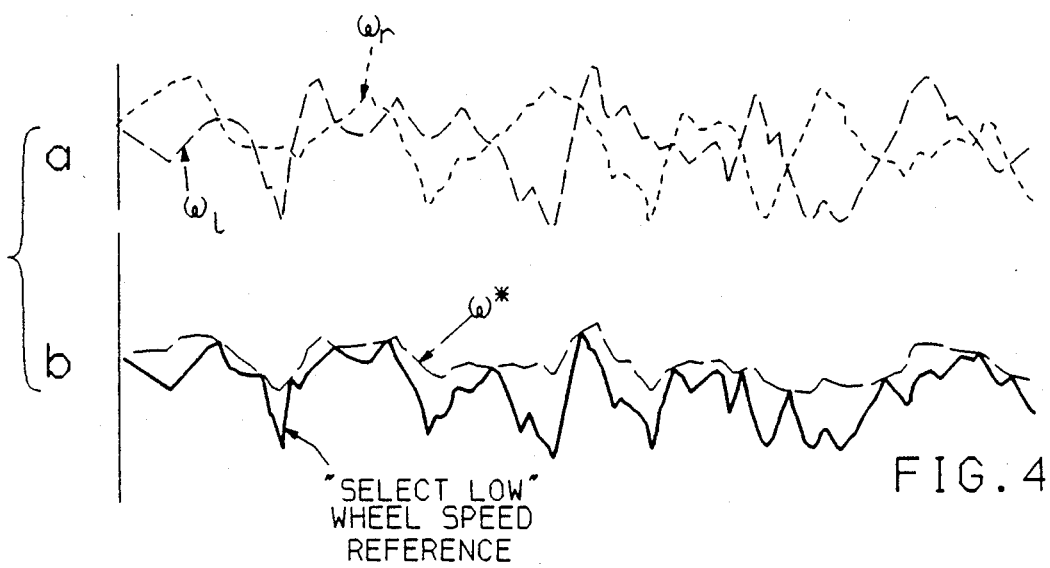
FIG. 4 is a diagram of the rear wheel speeds while being braked on a uniform coefficient of friction surface and the resultant wheel speed reference of the subject invention in comparison to a select low wheel speed reference.

Referring to FIG. 4, there is illustrated the determination of the rear wheel speed reference in accord with the principles of this invention when the wheels are being braked on a substantially uniform coefficient of friction surface. As can be seen from FIG. 4a, the relative values of the left and right rear wheel speeds $\omega_l$ and $\omega_r$ are random such that the relative values of the two wheel speeds are random. In the prior art systems wherein the rear wheel speed reference is based on the lowest of the two wheel speeds, the resultant select low wheel speed reference is a substantially noisy reference as illustrated in FIG. 4b. However, the rear wheel speed reference $\omega^*$ determined in accord with this invention is substantially noise free as illustrated in FIG. 4 and provides for more effective antilock brake control.

The foregoing description of a preferred embodiment for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A wheel lock control method for a vehicle having left and right rear wheels for transporting the vehicle over a roadway having varying coefficients of friction, each wheel having a brake responsive to a brake pressure for braking the wheel, the method comprising the steps of:

measuring the speeds $\omega_r$ and $\omega_l$ of the rear wheels;

sensing an incipient lockup condition of either of the rear wheels;

increasing a value of a rear wheel reference speed toward $\omega_r$ at a predetermined rate when $\omega_r$ is less than $\omega_l$;

increasing the value of the rear wheel reference speed toward $\omega_l$ at a predetermined rate when $\omega_l$ is less than $\omega_r$; and modulating the brake pressure to the brakes of the rear wheels when an incipient lockup condition of one of the rear wheels is sensed based upon the value of the rear wheel reference speed so as to prevent a wheel lockup condition.

2. A wheel lock control method for a vehicle having a pair of rear wheels for transporting the vehicle over a roadway having varying coefficients of friction, each wheel having a brake responsive to a brake pressure for braking the wheel, the method comprising the steps of:

measuring the speeds $\omega_{lr}$ and $\omega_{rl}$ of the rear wheels;

sensing an incipient lockup condition of either of the rear wheels;

setting a parameter S equal to (A) 1 when the measured speed $\omega_{lr}$ is lower than the measured speed $\omega_{rl}$ and (B) 0 when the measured speed $\omega_{rl}$ is lower than the measured speed $\omega_{lr}$;

filtering the parameter S;

determining a rear wheel reference speed equal to $K\omega_{lr}+(1-K)\omega_{rl}$ where K is the filtered parameter S;

modulating the brake pressure to the brakes of the rear wheels when an incipient lockup condition of one of the rear wheels is sensed based upon the value of the rear wheel reference speed so as to prevent an incipient wheel lockup condition.

3. The method of claim 2 further including the steps of:

determining the absolute value of the difference between the speeds $\omega_{rl}$ and $\omega_r$, determining the average of the speeds $\omega_{rl}$ and $\omega_l$; and setting the parameter S to a value of 0.5 when the determined absolute value is less than a predetermined fraction of the determined average.

4. A wheel lock control method for a vehicle having a pair of rear wheels for transporting the vehicle over a roadway having varying coefficients of friction, each wheel having a brake responsive to a brake pressure for braking the wheel, the method comprising the steps of:

measuring the speeds $\omega_{lr}$ and $\omega_{rl}$ of the rear wheels;

determining a hypothetical wheel speed of an unbraked wheel of the vehicle;

determining an optimum wheel slip value $\lambda_{opt}$;

sensing an incipient lockup condition of either of the rear wheels;

setting a parameter S equal to (A) 1 when the measured speed $\omega_{lr}$ is lower than the measured speed $\omega_{rl}$ and (B) 0 when the measured speed $\omega_{rl}$ is lower than the measured speed $\omega_{lr}$;

filtering the parameter S;

determining a rear wheel reference speed equal to $K\omega_{lr}+(1-K)\omega_{rl}$ where K is the filtered parameter S;

determining a value of wheel slip based on the determined rear wheel reference speed and the hypothetical wheel speed; and modulating the brake pressure to the brakes of the rear wheels to a common pressure when an incipient lockup condition of one of the rear wheels is sensed so as to maintain the determined value of wheel slip substantially at the determined optimum wheel slip value.

* * * * *